(12) United States Patent
Akimoto

(10) Patent No.: US 11,251,485 B2
(45) Date of Patent: Feb. 15, 2022

(54) LEAD-ACID BATTERY

(71) Applicant: GS Yuasa International Ltd., Kyoto (JP)

(72) Inventor: Takashi Akimoto, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 16/954,418

(22) PCT Filed: Dec. 17, 2018

(86) PCT No.: PCT/JP2018/046275
§ 371 (c)(1),
(2) Date: Jun. 16, 2020

(87) PCT Pub. No.: WO2019/131262
PCT Pub. Date: Jul. 4, 2019

(65) Prior Publication Data
US 2021/0083235 A1    Mar. 18, 2021

(30) Foreign Application Priority Data

Dec. 25, 2017    (JP) .............................. JP2017-247380

(51) Int. Cl.
*H01M 50/147*    (2021.01)
*H01M 50/10*    (2021.01)
(Continued)

(52) U.S. Cl.
CPC ......... *H01M 50/147* (2021.01); *H01M 10/12* (2013.01); *H01M 50/10* (2021.01); *H01M 50/394* (2021.01); *H01M 2220/20* (2013.01)

(58) Field of Classification Search
CPC .. H01M 50/147; H01M 50/394; H01M 50/10; H01M 50/12
See application file for complete search history.

(56) References Cited

U.S. PATENT DOCUMENTS 4,191,807 A * 3/1980 Karpal ................ H01M 50/172
429/176
4,613,550 A * 9/1986 Jergl ................... H01M 50/394
429/53
(Continued)

FOREIGN PATENT DOCUMENTS

JP    2008-117582 A    5/2008
JP    2008-117584 A    5/2008
(Continued)

OTHER PUBLICATIONS

Machine Translation of: JP 2010/272264A, Maeda et al., Dec. 2, 2010.*

(Continued)

*Primary Examiner* — Kenneth J Douyette
(74) *Attorney, Agent, or Firm* — Rankin, Hill & Clark LLP

(57) ABSTRACT

A lead-acid battery (100) is provided with a lid (14). An external flow passage (530) communicating with a communication chamber (520) through a vent hole (321) and communicating with a discharge port (405) of a lid (14) is formed inside the lid (14). A compartment fence (452, 454) continuously extending over the entire width of the external flow passage (530) is formed in the external flow passage (530). A residual volume is larger than the volume of the communication chamber (520), the residual volume being obtained by subtracting, from the total volume of a plurality of external spaces (460, 462, 464) divided by the compartment fence (452, 454), the volume of the discharge-side external space (464) closest to the discharge port among the plurality of external spaces.

1 Claim, 10 Drawing Sheets

(51) Int. Cl.
*H01M 10/12* (2006.01)
*H01M 50/30* (2021.01)

(56) References Cited

U.S. PATENT DOCUMENTS

| | | |
|---|---|---|
| 5,380,604 A | 1/1995 | Hampe et al. |
| 2006/0263680 A1 | 11/2006 | Fossati et al. |
| 2017/0062875 A1 | 3/2017 | Funo et al. |

FOREIGN PATENT DOCUMENTS

| | | |
|---|---|---|
| JP | 2010-205587 A | 9/2010 |
| JP | 2010-272264 A | 12/2010 |
| JP | 2010-282743 A | 12/2010 |
| JP | 5095992 B2 | 12/2012 |

OTHER PUBLICATIONS

International Search Report (ISR) dated Feb. 12, 2019 issued in PCT/JP2018/046275.

\* cited by examiner

LEAD-ACID BATTERY

TECHNICAL FIELD

A technique disclosed in the present specification relates to a lead-acid battery.

BACKGROUND ART

A lead-acid battery is mounted on a vehicle such as an automobile, for example, and is used as a power source for the vehicle or a power source for electrical components mounted on the vehicle. Such a lead-acid battery includes; a container having an opening and having a plurality of cell chambers formed therein in a predetermined direction; a lid joined to the opening of the container; and an electrode group disposed in each cell chamber.

In the lead-acid battery, for example, during charge, gas (oxygen gas or hydrogen gas) is generated from the electrode plate in the container, and internal pressure in the cell chamber increases, which may cause deformation of the container. Therefore, there has been known a lead-acid battery in which a lid is provided with a gas exhaust structure for exhausting gas generated in the container to the outside of the lead-acid battery. Specifically, an electrolyte solution reflux part and a liquid storage chamber are provided in the lid. The electrolyte solution reflux part communicates with the inside of the container through an exhaust hole and a reflux hole, and also communicates with the liquid storage chamber through a cutout. The liquid storage chamber extends to a discharge port formed on the outer surface of the lid. The ceiling surface side of the liquid storage chamber is divided by a plurality of partition walls (e.g., see Patent Document 1 below).

PRIOR ART DOCUMENT

Patent Document

Patent Document 1: JP-A-2010-272264

SUMMARY OF THE INVENTION

Problems to be Solved by the Invention

For example, when the lead-acid battery is inverted in position, the electrolyte solution in the housing chamber of the container flows into the communication chamber (electrolyte solution reflux part) and flows out of the communication chamber to the external flow passage (liquid storage chamber). As described above, in the conventional lead-acid battery, the ceiling surface side of the liquid storage chamber is divided into a plurality of external spaces. However, the electrolyte solution having flowed out of the communication chamber easily reaches the external space closest to the discharge port and easily leaks to the outside of the lid.

The present specification discloses a technique capable of preventing the electrolyte solution from flowing out to the outside of the lead-acid battery when the lead-acid battery is in an inverted position.

Means for Solving the Problems

The lead-acid battery disclosed in the present specification includes: a container having an opening on one side in a first direction and formed with a housing chamber communicating with the opening; a positive electrode and a negative electrode housed in the housing chamber of the container; and a lid disposed so as to close the opening of the container and has a discharge port formed on an outer surface, in which a communication chamber and an external flow passage are formed inside the lid, the communication chamber communicating with the housing chamber through the communication hole, the external flow passage being surrounded by at least a partition wall between the housing chamber and the communication chamber and a facing wall that faces the partition wall in the first direction, the external flow passage communicating with the communication chamber through a vent hole and communicating with the discharge port of the lid, a compartment fence is formed on the facing wall in the external flow passage, the compartment fence protruding toward the partition wall and continuously extending over an entire width of the external flow passage in a direction intersecting with the external flow passage, and a residual volume is larger than a volume of the communication chamber, the residual volume being obtained by subtracting, from a total volume of a plurality of external spaces divided by the compartment fence, a volume of a discharge-side external space closest to the discharge port among the plurality of external spaces.

MODE FOR CARRYING OUT THE INVENTION

Figure 1:
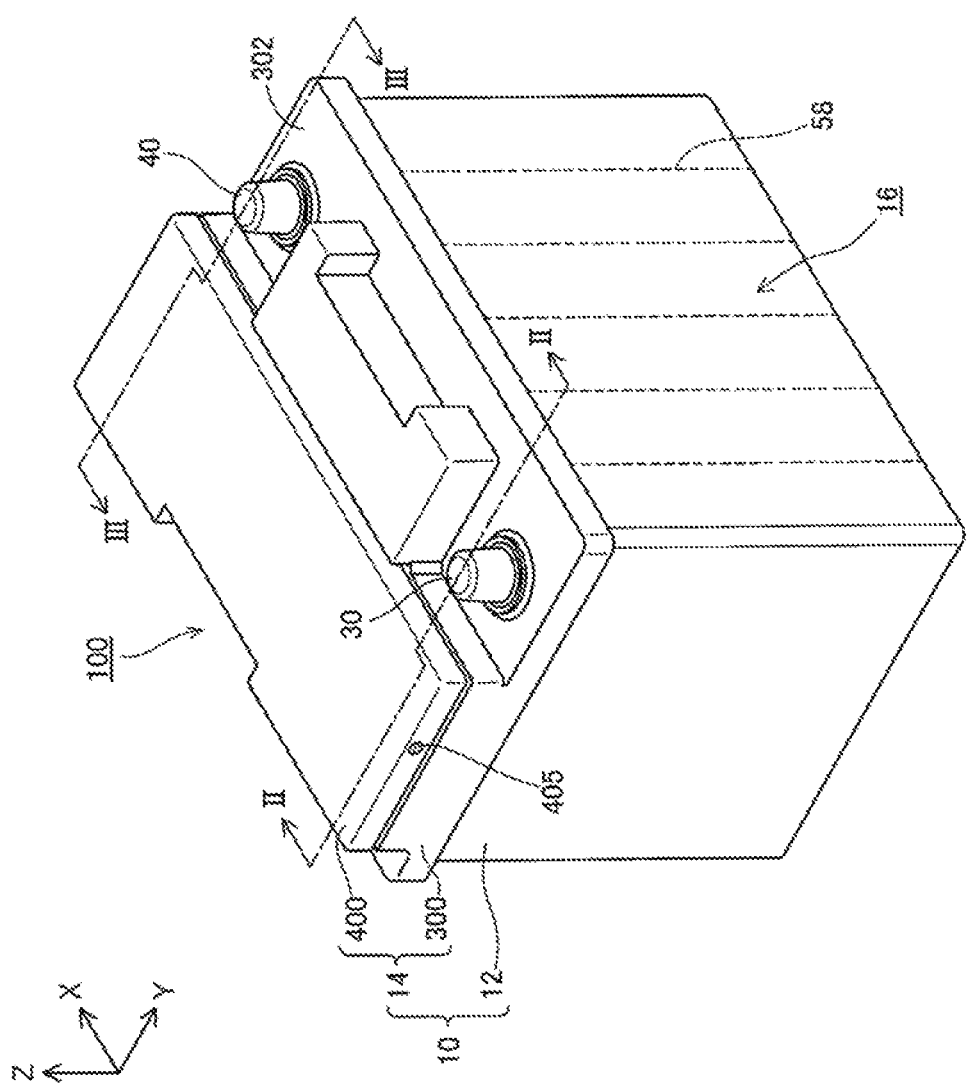
FIG. 1 is a perspective view illustrating an external configuration of a lead-acid battery 100 according to the present embodiment.

The technique disclosed in the present specification can be implemented as the following modes.

(1) The lead-acid battery disclosed in the present specification includes: a container having an opening on one side in a first direction and formed with a housing chamber communicating with the opening; a positive electrode and a negative electrode housed in the housing chamber of the container; and a lid disposed so as to close the opening of the container and has a discharge port formed on an outer surface. A communication chamber and an external flow passage are formed inside the lid. The communication chamber communicates with the housing chamber through the communication hole. The external flow passage is surrounded by at least a partition wall between the housing chamber and the external flow passage and a facing wall that faces the partition wall in the first direction, the external flow passage communicating with the communication chamber through a vent hole and communicating with the discharge port of the lid. A compartment fence is formed on the facing wall in the external flow passage, the compartment fence protruding toward the partition wall and continuously extending over an entire width of the external flow passage in a direction intersecting with the external flow passage. A residual volume is larger than a volume of the communication chamber, the residual volume being obtained by subtracting, from a total volume of a plurality of external spaces divided by the compartment fence, a volume of a discharge-side external space closest to the discharge port among the plurality of external spaces. In the lead-acid battery of the embodiment, a compartment fence is formed on the facing wall in the external flow passage. The compartment fence protrudes toward the partition wall and continuously extends over the entire width of the external flow passage in the direction intersecting with the external flow passage. Thus, for example, even when the lead-acid battery is inverted in position and the electrolyte solution in the housing chamber of the container flows into the external flow passage through the communication chamber, the electrolyte solution first remains between the communication chamber and the compartment fence. Thereafter, the electrolyte solution flows into the discharge port side from the compartment fence only when the electrolyte solution flows out beyond the compartment fence. That is, according to the lead-acid battery of the embodiment, it is possible to prevent the electrolyte solution from flowing into the discharge port side of the lid, as compared to a configuration in which the compartment fence is not formed in the external flow passage. Moreover, the residual volume is larger than the volume of the communication chamber, the residual volume being obtained by subtracting the volume of the discharge-side external space closest to the discharge port from the total volume of a plurality of external spaces divided by the compartment fence. It is thereby possible to prevent the electrolyte solution having flowed from the communication chamber into the external flow passage from leaking to the outside of the lead-acid battery through the discharge port formed on the outer surface of the lid.

(2) In the lead-acid battery, the compartment fence may include a first compartment fence disposed at a position closest to the vent hole in the external flow passage, and a second compartment fence disposed at a position farther from the vent hole than the first compartment fence, and among the plurality of external spaces, a volume of an external space between the communication chamber and the first compartment fence may be larger than a volume of an external space between the first compartment fence and the second compartment fence. In the lead-acid battery of the embodiment, the volume of the first external space between the communication chamber and the first compartment fence is larger than the volume of the second external space between the first compartment fence and the second compartment fence. It is thereby possible to prevent the electrolyte solution having flowed out of the communication chamber from approaching the discharge port side of the lid, as compared to a configuration in which the volume of the first space is smaller than the volume of the second space.

A. Embodiment

A-1. Configuration:
(Configuration of Lead-Acid Battery 100)

Figure 2:
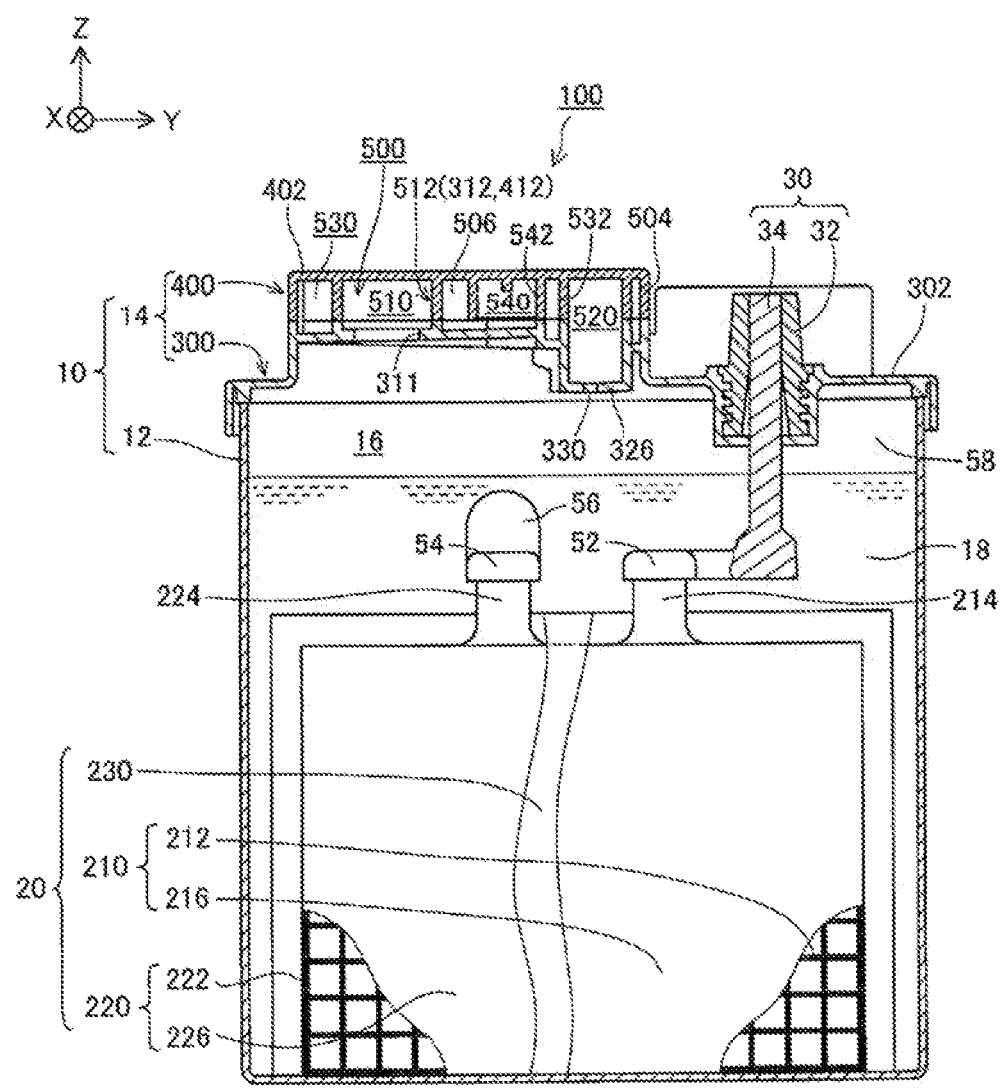
FIG. 2 is an explanatory view illustrating a YZ sectional configuration of the lead-acid battery 100 at a position II-II in FIG. 1.
Figure 3:
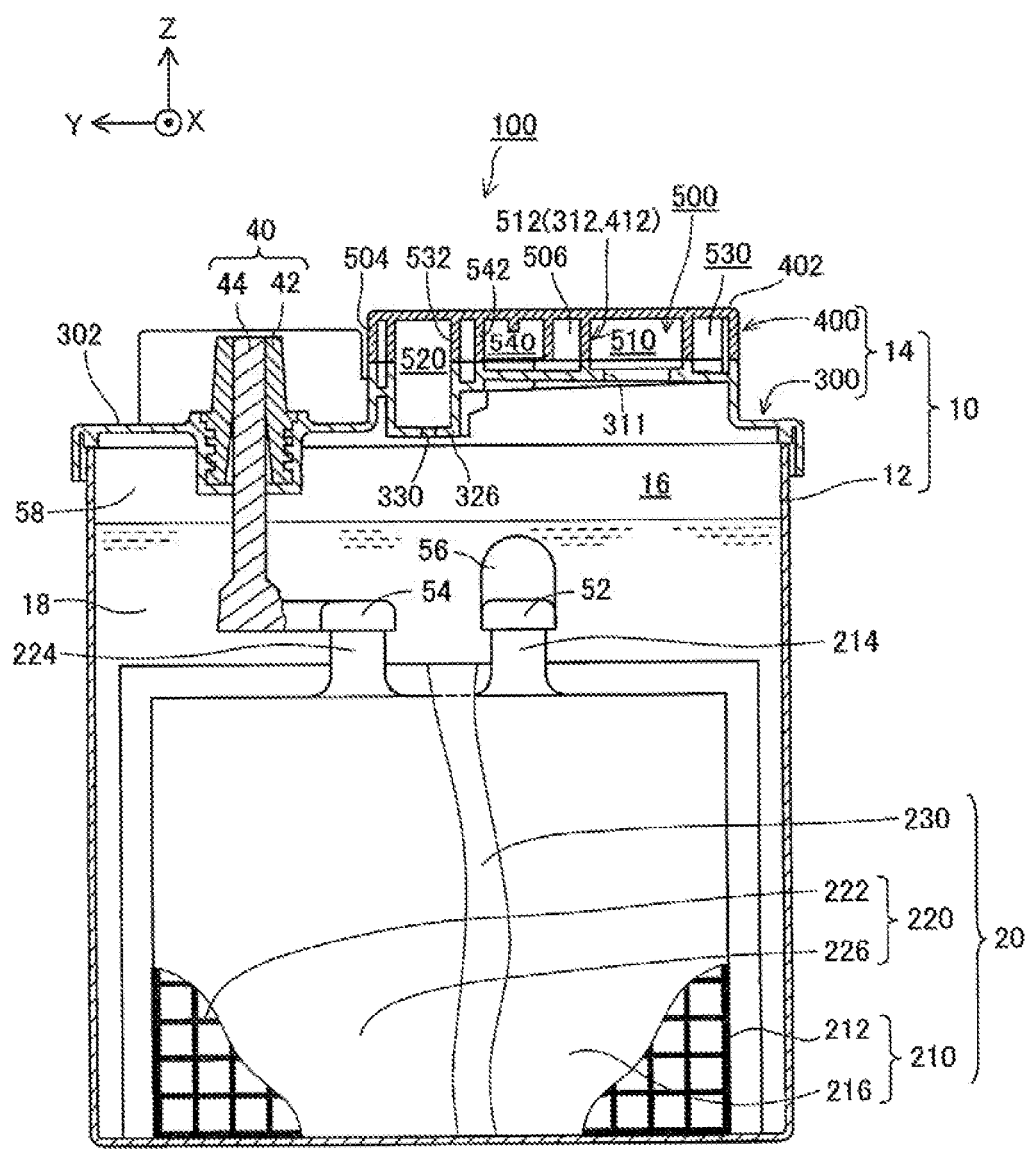
FIG. 3 is an explanatory view illustrating a YZ sectional configuration of the lead-acid battery 100 at a position III-III in FIG. 1.

FIG. 1 is a perspective view illustrating an external configuration of a lead-acid battery 100 in the present embodiment, FIG. 2 is an explanatory view illustrating a YZ sectional configuration of the lead-acid battery 100 at a position II-II in FIG. 1, and FIG. 3 is an explanatory view illustrating a YZ sectional configuration of the lead-acid battery 100 at a position III-III in FIG. 1. In FIGS. 2 and 3, for the sake of convenience, the configuration of an electrode group 20, which will be described later, is expressed in a form different from the actual configuration so as to be shown in an easily understandable manner. Each figure illustrates X, Y, and Z-axes orthogonal to each other for specifying directions. In the present specification, for the sake of convenience, the positive Z-axis direction is referred to as an "up direction" and the negative Z-axis direction is referred to as a "down direction," but the lead-acid battery 100 may be installed in a direction different from such directions. The vertical direction (Z-axis direction) corresponds to the first direction in the claims, the up direction (positive Z-axis) corresponds to one side in the first direction in the claims, and the down direction (negative Z-axis direction) corresponds to the other side in the first direction in the claims.

Since the lead-acid battery 100 can discharge a large current in a short time and can exhibit stable performance under various environments, for example, the lead-acid battery 100 is mounted on a vehicle such as an automobile, and is used as a power supply source to a starter at the time of starting an engine or a power supply source to various electrical components such as a light. As illustrated in FIGS. 1 to 3, the lead-acid battery 100 includes a housing 10, a positive-side terminal 30, a negative-side terminal 40, and a plurality of electrode groups 20. Hereinafter, the positive-side terminal 30 and the negative-side terminal 40 are also collectively referred to as "terminals 30, 40."

(Configuration of Housing 10)

The housing 10 has a container 12 and a lid 14. The container 12 is a substantially rectangular parallelepiped case having an opening on its upper surface, and is formed of, for example, synthetic resin. The lid 14 is a member disposed so as to close the opening of the container 12, and is formed of, for example, synthetic resin. By joining the peripheral portion of the lower surface of the lid 14 and the peripheral portion of the opening of the container 12 by, for example, heat welding, a space in which airtightness with the outside is maintained in the housing 10 is formed. The space in the housing 10 is divided by partitions 58 into a plurality of (e.g., six) cell chambers 16 arranged in a predetermined direction (the X-axis direction in the present embodiment). Hereinafter, the direction in which the plurality of cell chambers 16 are arranged (X-axis direction) is referred to as a "cell arrangement direction." As illustrated in FIG. 1 and the like, the position of the lead-acid battery 100 when the lid 14 is placed on the upper side of the container 12 is referred to as "normal position," and the position (vertical inversion of the lead-acid battery 100 illustrated in FIG. 1, etc.) of the lead-acid battery 100 when the lid 14 is placed on the lower side of the container 12 is referred to as "inverted position." In the following description, unless otherwise stated, it is assumed that the lead-acid battery 100 is in the normal position. A detailed configuration of the lid 14 will be described later.

One electrode group 20 is housed in each cell chamber 16 in the housing 10. Thus, for example, when the space in the housing 10 is divided into six cell chambers 16, the lead-acid battery 100 includes six electrode groups 20. Further, each cell chamber 16 in the housing 10 contains an electrolyte solution 18 containing dilute sulfuric acid, and the entire electrode group 20 is immersed in the electrolyte solution 18. The electrolyte solution 18 is injected into the cell chamber 16 through a liquid electrolyte solution filling hole 311, described later, provided in the lid 14.

(Configuration of Electrode Group 20)

The electrode group 20 includes a plurality of positive electrode plates 210, a plurality of negative electrode plates 220, and a separator 230. The plurality of positive electrode plates 210 and the plurality of negative electrode plates 220 are arranged so that the positive electrode plates 210 and the negative electrode plates 220 are arranged alternately. Hereinafter, the positive electrode plate 210 and the negative electrode plate 220 are also collectively referred to as "polar plates 210, 220."

The positive electrode plate 210 has a positive current collector 212 and a positive active material 216 supported by the positive current collector 212. The positive current collector 212 is a conductive member having skeletons arranged in substantially the form of a grid or a net, and is formed of, for example, lead or a lead alloy. The positive current collector 212 has a positive electrode lug 214 protruding upward near the upper end of the positive current collector 212. The positive active material 216 contains lead dioxide. The positive active material 216 may further include known additives.

The negative electrode plate 220 has a negative current collector 222 and a negative active material 226 supported by the negative current collector 222. The negative current collector 222 is a conductive member having skeletons arranged in substantially the form of a grid or a net, and is formed of, for example, lead or a lead alloy. The negative current collector 222 has a negative electrode lug 224 protruding upward near the upper end of the negative current collector 222. The negative active material 226 contains lead. The negative active material 226 may further contain a known additive.

The separator 230 is formed of an insulating material (e.g., glass or synthetic resin). The separator 230 is disposed so as to be interposed between the adjacent positive electrode plate 210 and negative electrode plate 220. The separator 230 may be configured as an integral member or may be configured as a set of a plurality of members provided for each combination of the positive electrode plate 210 and the negative electrode plate 220.

The positive electrode lug 214 of each of the plurality of positive electrode plates 210 constituting the electrode group 20 is connected to a positive-side strap 52 formed of, for example, lead or a lead alloy. That is, the plurality of positive electrode plates 210 are electrically connected in parallel through the positive-side straps 52. Similarly, the negative electrode lugs 224 of each of the plurality of negative electrode plates 220 constituting the electrode group 20 is connected to a negative-side strap 54 formed of, for example, lead or a lead alloy. That is, the plurality of negative electrode plates 220 are electrically connected in parallel through the negative-side straps 54. Hereinafter, the positive-side strap 52 and the negative-side strap 54 are also collectively referred to as "straps 52, 54."

In a lead-acid battery 100, the negative-side strap 54 housed in one cell chamber 16 is connected to the positive-side strap 52 housed in another cell chamber 16 adjacent to one side (e.g., positive X-axis side) of the one cell chamber 16 through a connection member 56 formed of, for example, lead or a lead alloy. The positive-side strap 52 housed in the cell chamber 16 is connected to the negative-side strap 54 housed in another cell chamber 16 adjacent to the other side (e.g., negative X-axis direction side) in the cell chamber 16 through a connection member 56. That is, the plurality of electrode groups 20 provided in the lead-acid battery 100 are electrically connected in series through the straps 52, 54 and the connection member 56. As illustrated in FIG. 2, the positive-side strap 52 housed in the cell chamber 16 located at the end on one side in the cell arrangement direction (negative X-axis side) is connected not to the connection member 56 but to a positive pole 34 to be described later. As illustrated in FIG. 3, the negative-side strap 54 housed in the cell chamber 16 located at the end on the other side in the cell arrangement direction (positive X-axis side) is connected not to the connection member 56 but to a negative pole 44 to be described later.

(Configuration of Terminals 30, 40)

The positive-side terminal 30 is disposed near the end of the housing 10 on one side in the cell arrangement direction (negative X-axis side), and the negative-side terminal 40 is disposed near the end of the housing 10 on the other side in the cell arrangement direction (positive X-axis side).

As illustrated in FIG. 2, the positive-side terminal 30 includes a positive-side bushing 32 and the positive pole 34. The positive-side bushing 32 is a substantially cylindrical conductive member having a vertically penetrating hole formed therein and is formed of, for example, a lead alloy. The lower portion of the positive-side bushing 32 is embedded in the lid 14 by insert molding, and the upper portion of the positive-side bushing 32 protrudes upward from the upper surface of the lid 14. The positive pole 34 is a substantially cylindrical conductive member and is formed of, for example, a lead alloy. The positive pole 34 has been inserted into the hole of the positive-side bushing 32. The upper end of the positive pole 34 is located at substantially the same position as the upper end of the positive-side bushing 32, and is joined to the positive-side bushing 32 by, for example, welding. The lower end of the positive pole 34 protrudes downward of the lower end of the positive-side bushing 32 and further protrudes downward of the lower surface of the lid 14. As described above, the lower end of the positive pole 34 is connected to the positive-side strap 52 housed in the cell chamber 16 located at the end on one side in the cell arrangement direction (negative X-axis side).

As illustrated in FIG. 3, the negative-side terminal 40 includes a negative-side bushing 42 and the negative pole 44. The negative-side bushing 42 is a substantially cylindrical conductive member having a vertically penetrating hole formed therein and is formed of, for example, a lead alloy. The lower portion of the negative-side bushing 42 is embedded in the lid 14 by insert molding, and the upper portion of the negative-side bushing 42 protrudes upward from the upper surface of the lid 14. The negative pole 44 is a substantially cylindrical conductive member and is formed of, for example, a lead alloy. The negative pole 44 has been inserted into the hole of the negative-side bushing 42. The upper end of the negative pole 44 is located at substantially the same position as the upper end of the negative-side bushing 42, and is joined to the negative-side bushing 42 by, for example, welding. The lower end of the negative pole 44 protrudes below the lower end of the negative-side bushing 42, and further protrudes below the lower surface of the lid 14. As described above, the lower end of the negative pole 44 is connected to the negative-side strap 54 housed in the cell chamber 16 located at the other-side (the positive side in the X-axis direction) end in the cell arrangement direction.

During the discharge of the lead-acid battery 100, a load (not illustrated) is connected to the positive-side bushing 32 of the positive-side terminal 30 and the negative-side bushing 42 of the negative-side terminal 40. Electric power generated by a reaction (a reaction that generates lead sulfate from lead dioxide) at the positive electrode plate 210 of each electrode group 20 and a reaction (a reaction that generates lead sulfate from lead) at the negative electrode plate 220 of each electrode group 20 is supplied to the load. During the charge of the lead-acid battery 100, a power source (not illustrated) is connected to the positive-side bushing 32 of the positive-side terminal 30 and the negative-side bushing 42 of the negative-side terminal 40. By electric power supplied from the power supply, a reaction (a reaction that generates lead dioxide from lead sulfate) at the positive electrode plate 210 of each electrode group 20 and a reaction (a reaction that generates lead from lead sulfate) at the negative electrode plate 220 of each electrode group 20, and the lead-acid battery 100 is charged.

A-2. Detailed Configuration of Lid 14

Figure 4:
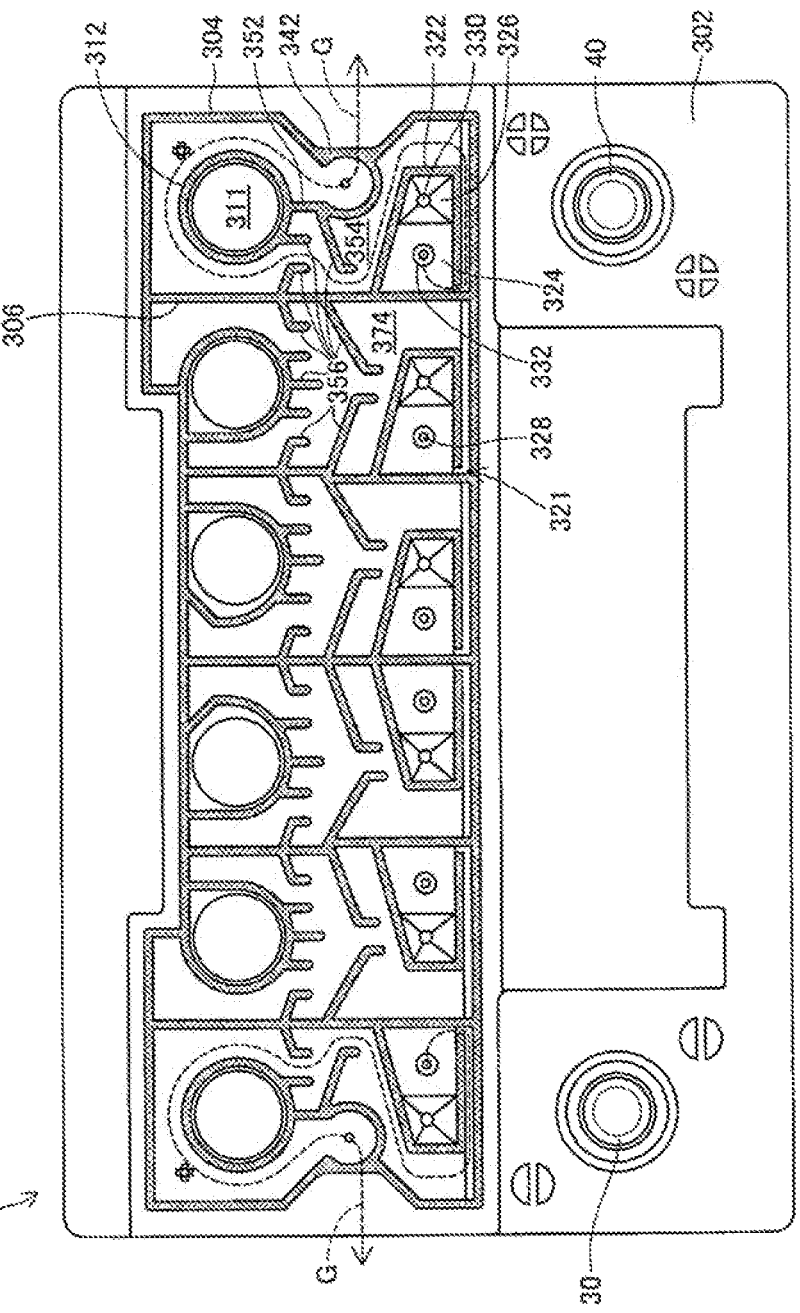
FIG. 4 is an explanatory view illustrating an XY plane configuration of an inner lid 300 as viewed from above (upper lid 400 side).
Figure 5:
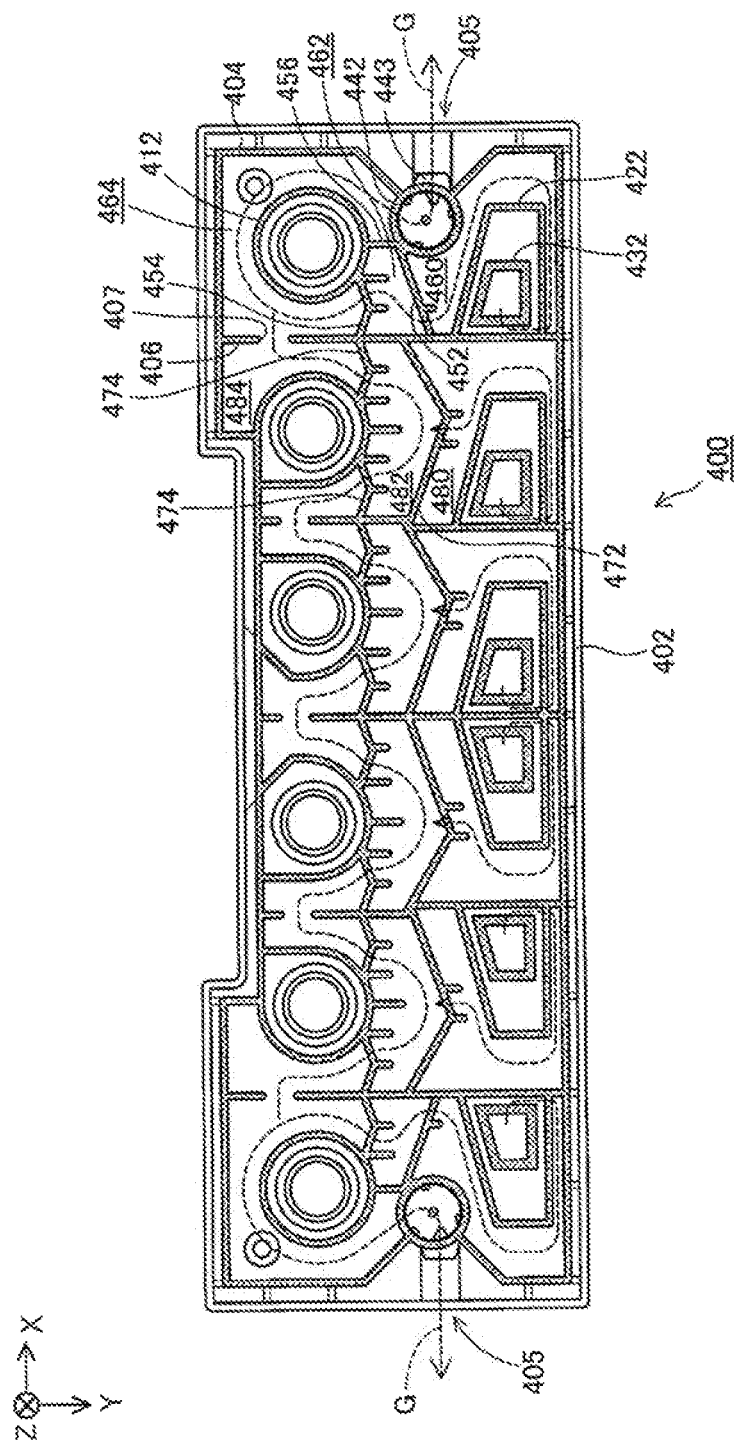
FIG. 5 is an XY plan view illustrating an upper lid 400 as viewed from below (inner lid 300).
Figure 6:
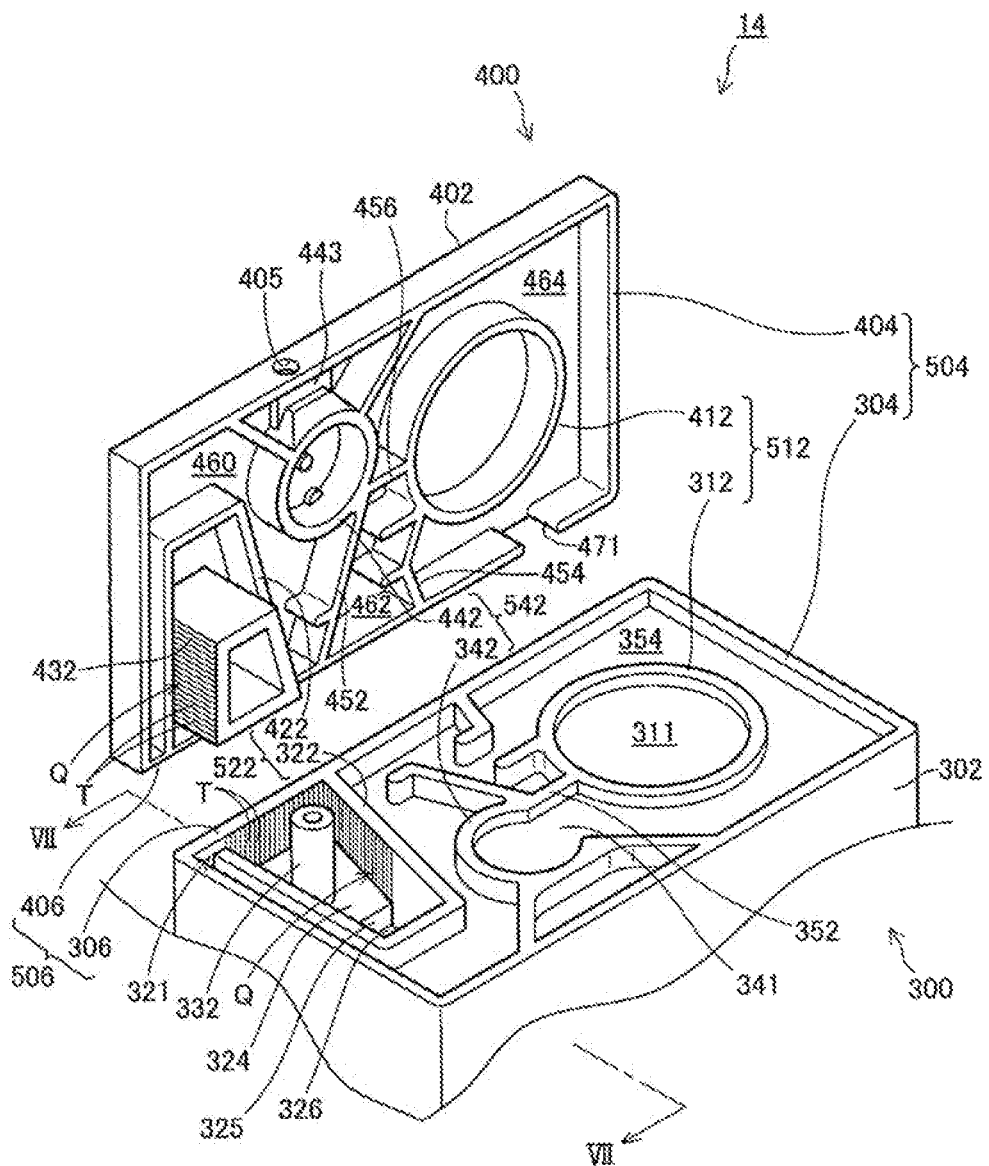
FIG. 6 is a perspective view illustrating a correspondence relationship of internal configurations of the inner lid 300 and the upper lid 400.
Figure 7:
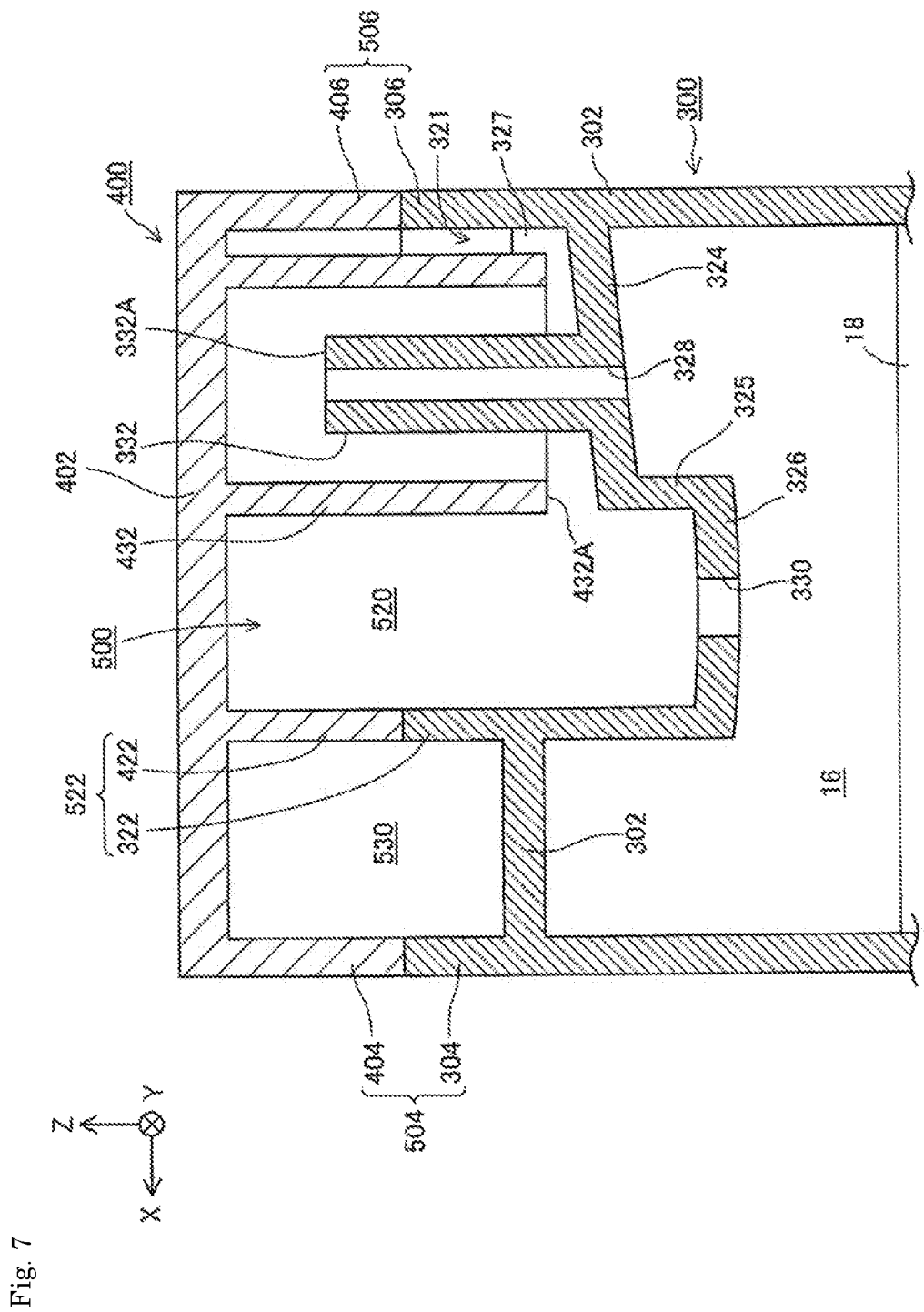
FIG. 7 is an explanatory view illustrating an XZ sectional configuration of a lid 14 at a position VII-VII in FIG. 6.

As illustrated in FIGS. 2 and 3, the lid 14 is a lid body having a so-called double lid structure and includes an inner lid 300 and an upper lid 400. The internal space of the lid 14 is formed between the inner lid 300 and the upper lid 400. FIG. 4 is an explanatory view illustrating an XY plan view of the inner lid 300 as viewed from above (upper lid 400 side), and FIG. 5 is an XY plan view of the upper lid 400 as viewed from the lower side (inner lid 300). FIG. 6 is a perspective view illustrating the internal configuration of the inner lid 300 and the upper lid 400. However, for the sake of convenience, FIG. 6 illustrates a state in which the upper lid 400 is separated from the inner lid 300, and only a portion of the inner lid 300 and the upper lid 400 constituting one compartment 500 is illustrated. FIG. 7 is an explanatory view illustrating the XZ sectional configuration of the lid 14 at the position VII-VII in FIG. 6. However, FIG. 7 illustrates an XZ sectional configuration of the upper lid 400 when the lid 14 illustrated in FIG. 6 is placed on the inner lid 300.

A-2-1. Internal Space of the Lid 14:

The internal space of the lid 14 is divided by partitions 506 into a plurality of (the same number as the number of cell chambers 16) compartments 500 arranged in the cell arrangement direction by the partition 506. Each compartment 500 corresponds to one of the plurality of cell chambers 16 and is located directly above the corresponding cell chamber 16. Hereinafter, a specific description will be given.

Specifically, as illustrated in FIGS. 2 to 4 and 6, the inner lid 300 has a flat inner-lid body 302, an inner-lid peripheral wall 304, and a plurality (one less than the number of cell chambers 16) of inner-lid partitions 306. The inner-lid peripheral wall 304 is disposed in a region of the upper surface of the inner-lid body 302 on the side opposite to the terminals 30, 40 in a direction (Y-axis direction, hereinafter referred to as "depth direction") substantially orthogonal to the cell arrangement direction (X-axis direction). The inner-lid peripheral wall 304 is formed so as to protrude upward from the upper surface of the inner-lid body 302. The inner-lid peripheral wall 304 has a substantially rectangular frame shape in a vertical direction (Z-axis view). The plurality of inner-lid partitions 306 are arranged in the inner-lid peripheral wall 304 at predetermined intervals in the cell arrangement direction. Each of the inner-lid partitions 306 extends in the depth direction, and both ends of each of the inner-lid partitions 306 in the depth direction are connected to the inner peripheral wall 304 (cf. FIG. 4).

Meanwhile, as illustrated in FIGS. 2, 3, 5, and 6, the upper lid 400 has a flat upper-lid body 402, an upper-lid peripheral wall 404, and a plurality (one less than the number of cell chambers 16) of upper-lid partitions 406. The upper-lid peripheral wall 404 is formed so as to protrude downward from the lower surface of the upper-lid body 402. A vertical view (Z-axis view) of the upper-lid peripheral wall 404 is a substantially rectangular frame shape extending along the peripheral edge portion of the upper-lid body 402. Discharge ports 405 penetrating the upper-lid peripheral wall 404 are formed at both ends of the upper-lid peripheral wall 404 facing each other in the cell arrangement direction (X-axis direction). The plurality of upper-lid partitions 406 are arranged at predetermined intervals in the cell arrangement direction. Each upper-lid partition 406 extends in the depth direction (Y-axis direction), and both ends of each upper-lid partition 406 in the depth direction are connected to the inner peripheral surface of the upper-lid peripheral wall 404 (cf. FIG. 5). However, in each upper-lid partition 406, a first cutout 407 is formed to be opened. Note that no cutout is formed in each of the above-mentioned inner-lid partitions 306 formed in the inner lid 300.

The inner-lid peripheral wall 304 and the upper-lid peripheral wall 404 are joined by thermal welding to form a peripheral wall 504 constituting the outer peripheral surface of the lid 14, thereby forming the internal space described above inside the lid 14. Each inner-lid partition 306 and each upper-lid partition 406 are joined by thermal welding to form the partition 506, whereby the internal space of the lid 14 is divided into a plurality of compartments 500. The plurality of compartments 500 communicate with each other through the first cutouts 407 formed in the respective upper-lid partitions 406.

A-2-2. Internal Configuration of Each Compartment 500:

Each compartment 500 includes an electrolyte solution filling chamber 510, a cell communication individual chamber 520, and an exhaust flow passage (external flow passage) 530. The compartment 500 located at the end in the cell arrangement direction (X-axis direction) (hereinafter referred to as "end-side compartment 500") further includes a concentrated exhaust chamber 540 (cf. FIGS. 2, 3, and 7).

(Electrolyte Solution Filling Chamber 510)

As illustrated in FIGS. 2 and 3, the electrolyte solution filling chamber 510 is a space for filling each cell chamber 16 of the container 12 with the electrolyte solution 18. Specifically, the electrolyte solution filling chamber 510 is a space surrounded by an electrolyte solution filling sidewall 512 having a substantially cylindrical shape in a vertical view (Z-axis view). As illustrated in FIGS. 4 and 6, an inner-lid electrolyte solution filling sidewall 312 is formed in the inner-lid peripheral wall 304 on the upper surface of the inner-lid body 302 so as to protrude upward from the inner-lid body 302. The inner-lid electrolyte solution filling sidewall 312 has a substantially cylindrical shape in the vertical view. The electrolyte solution filling hole 311 vertically penetrating the inner-lid body 302 is formed in the inner-lid electrolyte solution filling sidewall 312 on the upper surface of the inner-lid body 302. The electrolyte solution 18 can be poured into the cell chamber 16 of the container 12 from the electrolyte solution filling hole 311. Meanwhile, as illustrated in FIGS. 5 and 6, in the upper-lid peripheral wall 404 on the lower surface of the upper-lid body 402, an upper-lid electrolyte solution filling sidewall 412 is formed at a position facing the inner-lid electrolyte solution filling sidewall 312 so as to protrude downward from the upper-lid body 402. The upper-lid electrolyte solution filling sidewall 412 has a substantially cylindrical shape in the vertical view. The inner-lid electrolyte solution filling sidewall 312 and the upper-lid electrolyte solution filling sidewall 412 are joined by thermal welding to form the electrolyte solution filling sidewall 512, thereby forming the electrolyte solution filling chamber 510 inside the lid 14 (cf. FIGS. 2 and 3).

(Cell Communication Individual Chamber 520)

The cell communication individual chamber 520 is a space in which communication holes (an exhaust hole 328 and a reflux hole 330 to be described later) are formed and which communicates with the cell chamber 16 through the communication hole. Specifically, the cell communication individual chamber 520 is a space surrounded by the partition 506 and an exhaust sidewall 522, and the cell communication individual chamber 520 has a substantially trapezoidal shape in the vertical view. As illustrated in FIGS. 4 and 6, in the inner-lid peripheral wall 304 on the upper surface of the inner-lid body 302, an inner-lid exhaust sidewall 322 constituting a substantially trapezoidal partition together with the inner-lid partition 306 is formed so as to protrude upward from the inner-lid body 302. Meanwhile, as illustrated in FIGS. 5 and 6, in the upper-lid peripheral wall 404 on the lower surface of the upper-lid body 402, an upper-lid exhaust sidewall 422 constituting a substantially trapezoidal partition together with the upper-lid partition 406 is formed at a position facing the inner-lid exhaust sidewall 322 so as to protrude downward from the upper-lid body 402. The inner-lid exhaust sidewall 322 and the upper-lid exhaust sidewall 422 are joined by thermal welding to form an exhaust sidewall 522, thereby forming the cell communication individual chamber 520 inside the lid 14 (cf. FIGS. 2, 3, and 7). However, as illustrated in FIG. 6, a second cutout 321 is formed between the inner-lid partition 306 and the inner-lid exhaust sidewall 322, and no cutout is formed between the upper-lid partition 406 and the upper-lid exhaust sidewall 422. Hence the cell communication individual chamber 520 communicates with the exhaust flow passage 530 through the second cutout 321. The cell communication individual chamber 520 corresponds to the communication chamber in the claims, the partition 506 and the exhaust sidewall 522 correspond to the sidewall in the claims, and the second cutout 321 corresponds to the vent hole in the claims.

A portion of the inner-lid body 302 located inside the inner-lid partition 306 and the inner-lid exhaust sidewall 322 in a vertical direction view includes a first partition wall 324, a second partition wall 326, and a step 325 for connecting the first partition wall 324 and the second partition wall 326. The first partition wall 324, the second partition wall 326, and the step 325 are walls for partition walling the cell chamber 16 and the cell communication individual chamber 520. The first partition wall 324 is disposed at a position closer to the second cutout 321 than the second partition wall 326. As illustrated in FIG. 7, the first partition wall 324 and the second cutout 321 are separated from each other in the vertical direction (Z-axis direction). In other words, the second cutout 321 is located above the upper surface of the first partition wall 324. Specifically, a stepped part 327 extending upward from the first partition wall 324 is formed between the first partition wall 324 and the second cutout 321, whereby the first partition wall 324 and the second cutout 321 are separated from each other in the vertical direction. The second cutout 321 and the lower surface of the upper-lid body 402 are also separated from each other in the vertical direction. In other words, the second cutout 321 is located below the lower surface of the upper-lid body 402.

In the first partition wall 324, an exhaust hole 328 is formed penetrating the first partition wall 324 in the vertical direction. On the upper surface of the first partition wall 324, a substantially tubular communication tubular part 332 is formed extending upward from the first partition wall 324 while surrounding the exhaust hole 328. An upper tip 332A of the communication tubular part 332 is located above the upper surface of the inner-lid partition 306 and the upper surface of the inner-lid exhaust sidewall 322, and reaches the inside of the upper lid 400 (cf. FIG. 7).

As described above, the second partition wall 326 is disposed at a position farther from the second cutout 321 than the first partition wall 324. The second partition wall 326 is located below the first partition wall 324 (electrode group 20 side) through the step 325 extending in the vertical direction. In the second partition wall 326, a reflux hole 330 is formed penetrating the second partition wall 326 in the vertical direction. That is, the reflux hole 330 is disposed at a position closer to the liquid surface of the electrolyte solution 18 than the exhaust hole 328. Note that the first partition wall 324 is inclined obliquely downward toward the second partition wall 326, and the second partition wall 326 is inclined toward the reflux hole 330 (cf. FIG. 7). Thereby, when the lead-acid battery 100 is set to the normal position, the electrolyte solution 18 remaining in the cell communication individual chamber 520 can be smoothly guided to the reflux hole 330 along the inclination of the first partition wall 324 and the second partition wall 326 and returned to the inside of the cell chamber 16. The exhaust hole 328 and the reflux hole 330 correspond to the communication hole in the claims. The portion of the upper-lid body 402 facing the first partition wall 324 and the second partition wall 326 corresponds to the facing wall in the claims.

As illustrated in FIGS. 6 and 7, on the lower surface of the upper-lid body 402, an exhaust tubular wall 432 is formed at a position facing an exhaust hole 328 formed in the first partition wall 324 of the inner-lid body 302 so as to protrude downward from the upper-lid body 402. The exhaust tubular wall 432 has a substantially square tubular shape in the vertical direction (Z-axis view). A lower tip 432A of the exhaust tubular wall 432 is located below the second cutout 321. The tip 432A of the exhaust tubular wall 432 is located below the upper tip 332A of the communication tubular part 332 of the inner lid 300, and the exhaust tubular wall 432 is disposed so as to surround the communication tubular part 332 of the inner lid 300. The exhaust tubular wall 432 corresponds to the inner wall in the claims, and the tip 432A of the exhaust tubular wall 432 corresponds to the tip of the inner wall on the other side in the first direction in the claims.

Figure 8:
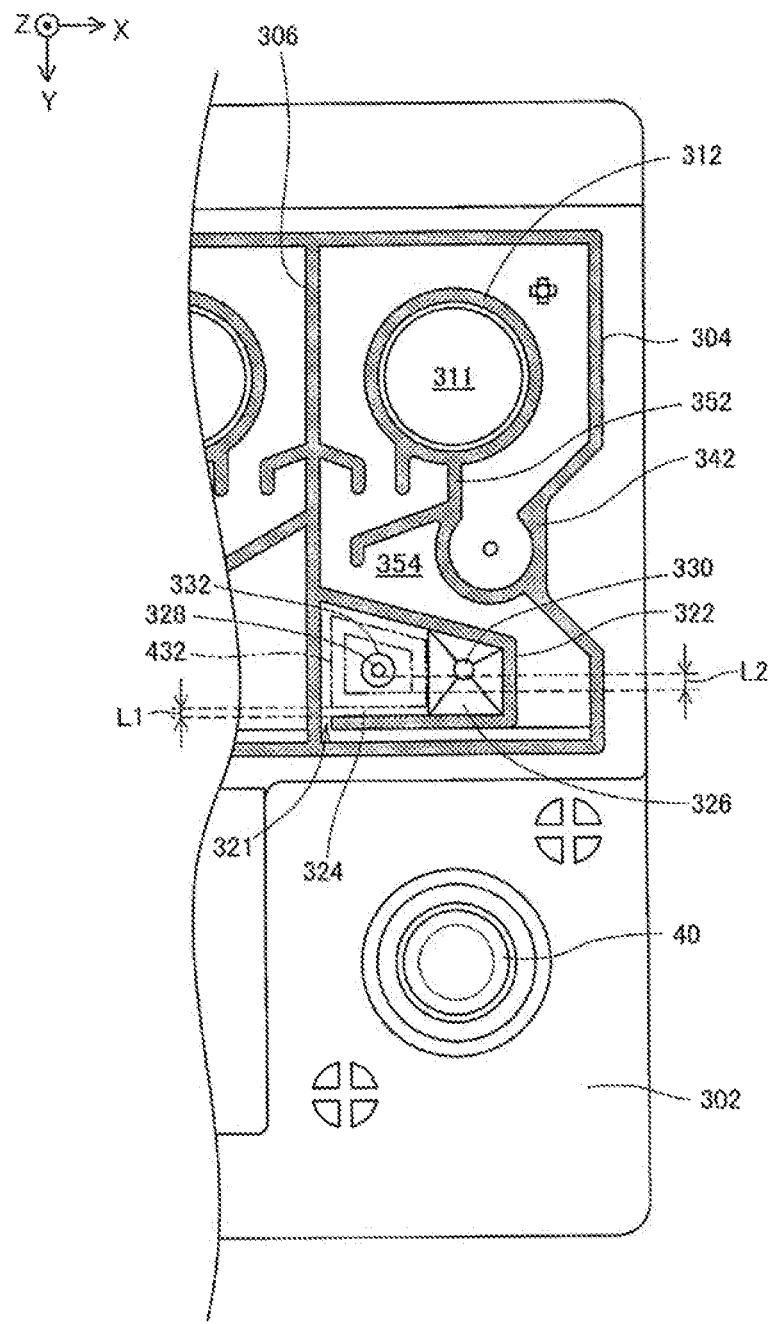
FIG. 8 is an XY plan view illustrating the configuration of the upper surface side of the inner lid 300.

FIG. 8 is an XY plan view illustrating the configuration of the upper surface side of the inner lid 300. In FIG. 8, the exhaust tubular wall 432 formed in the upper lid 400 is illustrated by a two-dot chain line. As illustrated in FIG. 8, a part of the exhaust tubular wall 432 faces a second cutout 321 (vent hole) formed in the cell communication individual chamber 520. A first distance L1, which is the shortest distance between the exhaust tubular wall 432 and a hole formation part (a cutout between upper-lid partition 406 and upper-lid exhaust sidewall 422) where the second cutout 321 is formed, is shorter than a second distance L2, which is the shortest distance between the exhaust tubular wall 432 and a portion (communication tubular part 332) where the exhaust hole 328 is formed (cf. FIG. 7). Note that the first distance L1 is preferably 3 mm or less, and more preferably 2 mm or less. In the present embodiment, the first distance L1 is 1.5 mm. The tip 432A of the exhaust tubular wall 432 is located below the entire second cutout 321 (cell chamber 16 side). The width of the second cutout 321 in at least one direction (e.g., the lateral width in a direction perpendicular to the vertical direction) is preferably 3 mm or less, and more preferably 2 mm or less. In the present embodiment, the lateral width of the second cutout 321 is 1.5 mm.

Figure 9:
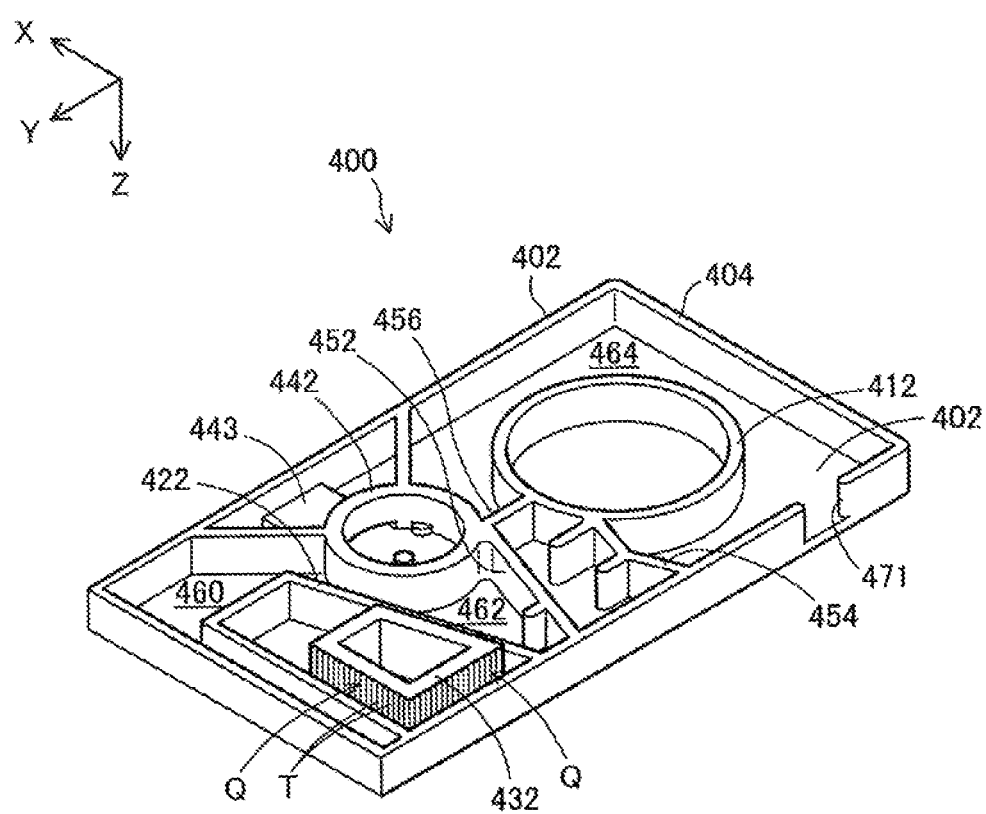
FIG. 9 is a perspective view illustrating the configuration of the lower surface side of the upper lid 400.

FIG. 9 is a perspective view illustrating the configuration of the lower surface side of the upper lid 400. As illustrated in FIGS. 6 and 9, an internal flow passage Q communicating with the second cutout 321 and located closer to the cell chamber 16 side than the second cutout 321 is formed between the exhaust tubular wall 432 and the exhaust sidewall 522 (the upper-lid partition 406 and the upper-lid exhaust sidewall 422). The facing distance between the facing surfaces of the exhaust tubular wall 432 and the exhaust sidewall 522 facing each other and forming the internal flow passage Q is preferably 3 mm or less, and more preferably 2 mm or less. In the present embodiment, the facing distance is 1.5 mm.

As illustrated in FIGS. 6 and 9, at least a portion of the surfaces of the facing surfaces of the exhaust tubular wall 432 and the exhaust sidewall 522 has an uneven part T. Specifically, of the four outer surfaces of the exhaust tubular wall 432, the outer surface on the reflux hole 330 side is a substantially flat surface, and a plurality of uneven parts T are formed on the remaining three outer surfaces. A plurality of uneven parts T are formed in portions of the inner peripheral surfaces of the inner-lid partition 306 and the inner-lid exhaust sidewall 322 constituting the exhaust sidewall 522, the portions facing the remaining three outer surfaces of the exhaust tubular wall 432. Note that the remaining three outer surfaces of the exhaust tubular wall 432 and the exhaust sidewall 522 (the inner-lid partition 306 and the inner-lid exhaust sidewall 322) face each other with a distance substantially equal to the lateral width of the second cutout 321, thereby forming the internal flow passage Q. More specifically, on the facing surfaces of the exhaust tubular wall 432 and the exhaust sidewall 522, a plurality of uneven parts T extending in the vertical direction (Z-axis direction) are arranged in a direction parallel to the facing surface and substantially orthogonal to the vertical direction. The difference in height between the valley and peak of the uneven part T is preferably 0.1 mm or more. On the surface of the partition wall (the first partition wall 324 and the second partition wall 326) where the second cutout 321 is formed on the side of the upper lid 400, no uneven part T is formed, and the partition wall has a substantially flat surface.

(Concentrated Exhaust Chamber 540)

As illustrated in FIGS. 2 and 3, in each end-side compartment 500, the concentrated exhaust chamber 540 is located between the electrolyte solution filling chamber 510 and the cell communication individual chamber 520. The concentrated exhaust chamber 540 is a space surrounded by the concentrated exhaust sidewall 542 and has a substantially circular shape in the vertical view. Specifically, as illustrated in FIGS. 4 and 6, a substantially arcuate inner-lid concentrated exhaust sidewall 342 having a third cutout 341 formed on the side of the inner-lid electrolyte solution filling sidewall 312 is formed on the upper surface of the inner-lid body 302 so as to protrude upward from the inner-lid body 302. Meanwhile, as illustrated in FIGS. 5 and 6, a substantially cylindrical upper-lid concentrated exhaust sidewall 442 is formed on the lower surface of the upper-lid body 402 at a position facing the inner-lid concentrated exhaust sidewall 342 so as to protrude downward from the upper-lid body 402. A duct 443 communicating with the discharge port 405 is formed in the upper-lid concentrated exhaust sidewall 442. The inner-lid concentrated exhaust sidewall 342 and the upper-lid concentrated exhaust sidewall 442 are joined by thermal welding to form a concentrated exhaust sidewall 542, thereby forming the concentrated exhaust chamber 540 inside the lid 14 (cf. FIGS. 2 and 3). Further, a filter, not illustrated, is disposed in the concentrated exhaust chamber 540, and a gas G, having entered the inner-lid concentrated exhaust sidewall 342 from the exhaust flow passage 530 through the third cutout 341, enters the upper-lid concentrated exhaust sidewall 442 side through the filter, and is discharged to the outside of the lead-acid battery 100 (Lid 14) through the discharge port 405.

(Exhaust Flow Passage 530)

As illustrated in FIG. 6, the exhaust flow passage 530 communicates with the cell communication individual chamber 520 through the second cutout 321 and also communicates with the discharge port 405. Specifically, in the end-side compartment 500, the exhaust flow passage 530 communicates directly with the concentrated exhaust chamber 540, and further communicates with the discharge port 405 through the concentrated exhaust chamber 540. In the end-side compartment 500, the exhaust flow passage 530 extends from the second cutout 321 along the outer periphery of the exhaust sidewall 522, passes between the cell communication individual chamber 520 and the concentrated exhaust chamber 540, further extends along the outer periphery of the electrolyte solution filling chamber 510, and reaches the third cutout 341 of the concentrated exhaust chamber 540. A portion of the inner-lid body 302 constituting the exhaust flow passage 530 corresponds to the partition wall in the claims. A portion of the upper-lid body 402 constituting the exhaust flow passage 530 corresponds to the facing wall in the claims.

More specifically, as illustrated in FIGS. 4 and 6, on the upper surface of the inner-lid body 302, a coupling wall 352 for coupling the inner-lid electrolyte solution filling sidewall 312 and the inner-lid concentrated exhaust sidewall 342 is formed so as to protrude upward from the inner-lid body 302. Thus, an inner-lid exhaust flow passage 354, surrounded by an inner-lid peripheral wall 304, an inner-lid exhaust sidewall 322, the inner-lid partition 306, the inner-lid electrolyte solution filling sidewall 312, and the coupling wall 352, is formed in the inner lid 300. The bottom surface in the inner-lid exhaust flow passage 354 in the inner-lid body 302 is flush over the entire length of the inner-lid exhaust flow passage 354 and is inclined toward the second cutout 321. Thereby, when the lead-acid battery 100 is in the normal position, the electrolyte solution 18 having leaked into the exhaust flow passage 530 can be smoothly returned into the cell communication individual chamber 520 through the bottom surface in the inner-lid exhaust flow passage 374. That is, the inner-lid exhaust flow passage 354 is continuously connected over the entire length. Note that a plurality of ribs 356 are formed in the inner-lid exhaust flow passage 354. The plurality of ribs 356 trap mist (steam) contained in the gas G from the second cutout 321 to the third cutout 341, and aggregate the mist into water. The plurality of ribs 356 prevent the electrolyte solution 18, having flowed out of the cell communication individual chamber 520 to the exhaust flow passage 530 through the second cutout 321, from flowing to the discharge port 405 side.

Meanwhile, as illustrated in FIGS. 5 and 6, a first coupling wall 452 coupling the upper-lid partition 406 and the upper-lid concentrated exhaust sidewall 442, a second coupling wall 454 coupling the upper-lid partition 406 and the upper-lid electrolyte solution filling sidewall 412, and a third coupling wall 456 coupling the upper-lid electrolyte solution filling sidewall 412 and the upper-lid concentrated exhaust sidewall 442 are formed on the lower surface of the upper-lid body 402 so as to each protrude downward from the upper-lid body 402. No cutout is formed in any of the first coupling wall 452, the second coupling wall 454 and the third coupling wall 456. Accordingly, a first upper-lid space 460, a second upper-lid space 462, and a third upper-lid space 464 are formed in the end-side compartment 500 of the upper lid 400. The first upper-lid space 460 is a space surrounded by the upper-lid peripheral wall 404, the upper-lid exhaust sidewall 422, the upper-lid concentrated exhaust sidewall 442, and the coupling wall 452, and is disposed at a position closest to the second cutout 321. The second upper-lid space 462 is a space surrounded by the upper-lid partition 406, the first coupling wall 452, the second coupling wall 454, and the third coupling wall 456, and is disposed at a position farther from the second cutout 321 than the first upper-lid space 460. The third upper-lid space 464 is a space surrounded by the upper-lid peripheral wall 404, the upper-lid partition 406, the upper-lid electrolyte solution filling sidewall 412, the second coupling wall 454, and the third coupling wall 456, and is disposed at a position still farther from the second cutout 321 than the second upper-lid space 462. As described above, in the end-side compartment 500, the exhaust flow passage 530 is continuously connected on the inner lid 300 side, and is divided into three spaces (external spaces) 460, 462, 464 on the upper lid 400 side by the first coupling wall 452, the second coupling wall 454, and the third coupling wall 456. The total volume (the volume of the electrolyte solution 18 contained) of the second upper-lid space 462 and the third upper-lid space 464 is larger than the volume of the upper-lid exhaust sidewall 422. The volume of the first upper-lid space 460 is larger than that of the second upper-lid space 462. The first coupling wall 452 and the second coupling wall 454 each correspond to the compartment fence in the claims.

In the compartment 500 (hereinafter referred to as "inner compartment 500") located inside the end-side compartment 500 in the cell arrangement direction (X-axis direction) among the plurality of compartments 500, the exhaust flow passage 530 communicates with the concentrated exhaust chamber 540 through the other compartment 500. In the inner compartment 500, the exhaust flow passage 530 extends from the second cutout 321 along the outer periphery of the exhaust sidewall 522, passes between the cell communication individual chamber 520 and the concentrated exhaust chamber 540, and reaches the first cutout 407 formed in the upper-lid partition 406.

More specifically, as illustrated in FIG. 4, an inner-lid exhaust flow passage 374, surrounded by the inner-lid peripheral wall 304, the inner-lid exhaust sidewall 322, the inner-lid partition 306, and the inner-lid electrolyte solution filling sidewall 312, is formed in the inner lid 300. The bottom surface in the inner-lid exhaust flow passage 374 in the inner-lid body 302 is flush over the entire length of the inner-lid exhaust flow passage 374 and is inclined toward the second cutout 321. That is, the inner-lid exhaust flow passage 374 is continuously connected over the entire length. Thereby, when the lead-acid battery 100 is in the normal position, the electrolyte solution 18 having leaked into the exhaust flow passage 530 can be smoothly returned into the cell communication individual chamber 520 through the bottom surface in the inner-lid exhaust flow passage 374. Note that a plurality of ribs 356 are formed in the inner-lid exhaust flow passage 374. The plurality of ribs 356 trap mist (steam) contained in the gas G from the second cutout 321 to the third cutout 341, and aggregate the mist into water. The plurality of ribs 356 prevent the electrolyte solution 18, having flowed out of the cell communication individual chamber 520 to the exhaust flow passage 530 through the second cutout 321, from flowing to the first cutout 407 side.

Meanwhile, as illustrated in FIG. 5, a fourth coupling wall 472 coupling the upper-lid partitions 406 facing each other and a pair of fifth coupling walls 474 coupling the upper-lid electrolyte solution filling sidewalls 412 and the upper-lid partitions 406 are formed on the lower surface of the upper-lid body 402 so as to each protrude downward from the upper-lid body 402. No cutout is formed in either the fourth coupling wall 472 or the fifth coupling wall 474. Accordingly, a fourth upper-lid space 480, a fifth upper-lid space 482, and a sixth upper-lid space 484 are formed in the inner compartment 500 of the upper lid 400. The fourth upper-lid space 480 is a space surrounded by the upper-lid peripheral wall 404, the upper-lid partition 406, the upper-lid exhaust sidewall 422, and the fourth coupling wall 472, and is disposed at a position closest to the second cutout 321. The fifth upper-lid space 482 is a space surrounded by the upper-lid partition 406, the fourth coupling wall 472, the upper-lid electrolyte solution filling sidewall 412, and the fifth coupling wall 474, and is disposed at a position farther from the second cutout 321 than the fourth upper-lid space 480. The sixth upper-lid space 484 is a space surrounded by the upper-lid peripheral wall 404, the upper-lid partition 406, the upper-lid electrolyte solution filling sidewall 412, and the fifth coupling wall 474, and is disposed at a position still farther from the second cutout 321 than the fifth upper-lid space 482. As described above, in the inner compartment 500, the exhaust flow passage 530 is continuously connected to each other on the inner lid 300 side, and is divided into three spaces (external spaces) 480, 482, 484 on the upper lid 400 side by the fourth coupling wall 472 and the fifth coupling walls 474. The fourth coupling wall 472 and the fifth coupling wall 474 each correspond to the compartment fence in the claims.

A-3. Effects of Present Embodiment

When the lead-acid battery 100 is inverted in position, the electrolyte solution 18 in the cell chamber 16 flows into the cell communication individual chamber 520 through the communication holes (the exhaust holes 328 and the reflux hole 330) formed in the cell communication individual chamber 520, and the water level of the electrolyte solution 18 in the cell communication individual chamber 520 rises. When the water level of the electrolyte solution 18 reaches the second cutout 321 formed in the cell communication individual chamber 520, the electrolyte solution 18 may flow out to the outside the cell communication individual chamber 520 (to the exhaust flow passage 530) through the second cutout 321.

Here, supposing that the tip 432A of the exhaust tubular wall 432 is disposed on the upper-lid body 402 side (positive Z-axis) from at least a part of the second cutout 321, or the distance between the exhaust tubular wall 432 and the second cutout 321 is longer than the distance between the exhaust tubular wall 432 and the exhaust hole 328 or the reflux hole 330, the electrolyte solution 18 would easily flow out to the outside of the cell communication individual chamber 520. That is, in these configurations, there is no obstacle preventing the air existing in the exhaust flow passage 530 from flowing into the cell communication individual chamber 520 through the second cutout 321. Therefore, the air existing in the exhaust flow passage 530 easily enters the cell communication individual chamber 520 through the second cutout 321. As a result, by so-called vapor-liquid exchange in which the electrolyte solution 18 flows out of the cell communication individual chamber 520 into the exhaust flow passage 530 at the same time when air flows from the exhaust flow passage 530 into the cell communication individual chamber 520, the electrolyte solution 18 easily flows out to the exhaust flow passage 530.

In contrast, in the lead-acid battery 100 of the present embodiment, the cell communication individual chamber 520 is provided with the exhaust tubular wall 432 disposed so as to face the second cutout 321 at a position close to the second cutout 321. The tip 432A of the exhaust tubular wall 432 on the cell chamber 16 side (negative Z-axis) is formed at a position on the cell chamber 16 side from the second cutout 321. Therefore, the air existing in the exhaust flow passage 530 hardly enters the cell communication individual chamber 520 through the second cutout 321, thus preventing the vapor-liquid exchange between the inside and outside of the cell communication individual chamber 520. Thus, according to the present embodiment, it is possible to prevent the electrolyte solution 18 from flowing out to the exhaust flow passage 530 and further to the outside of the housing 10 when the lead-acid battery 100 is in the inverted position. Next, the effects of the present embodiment will be described in more detail.

Figure 10:
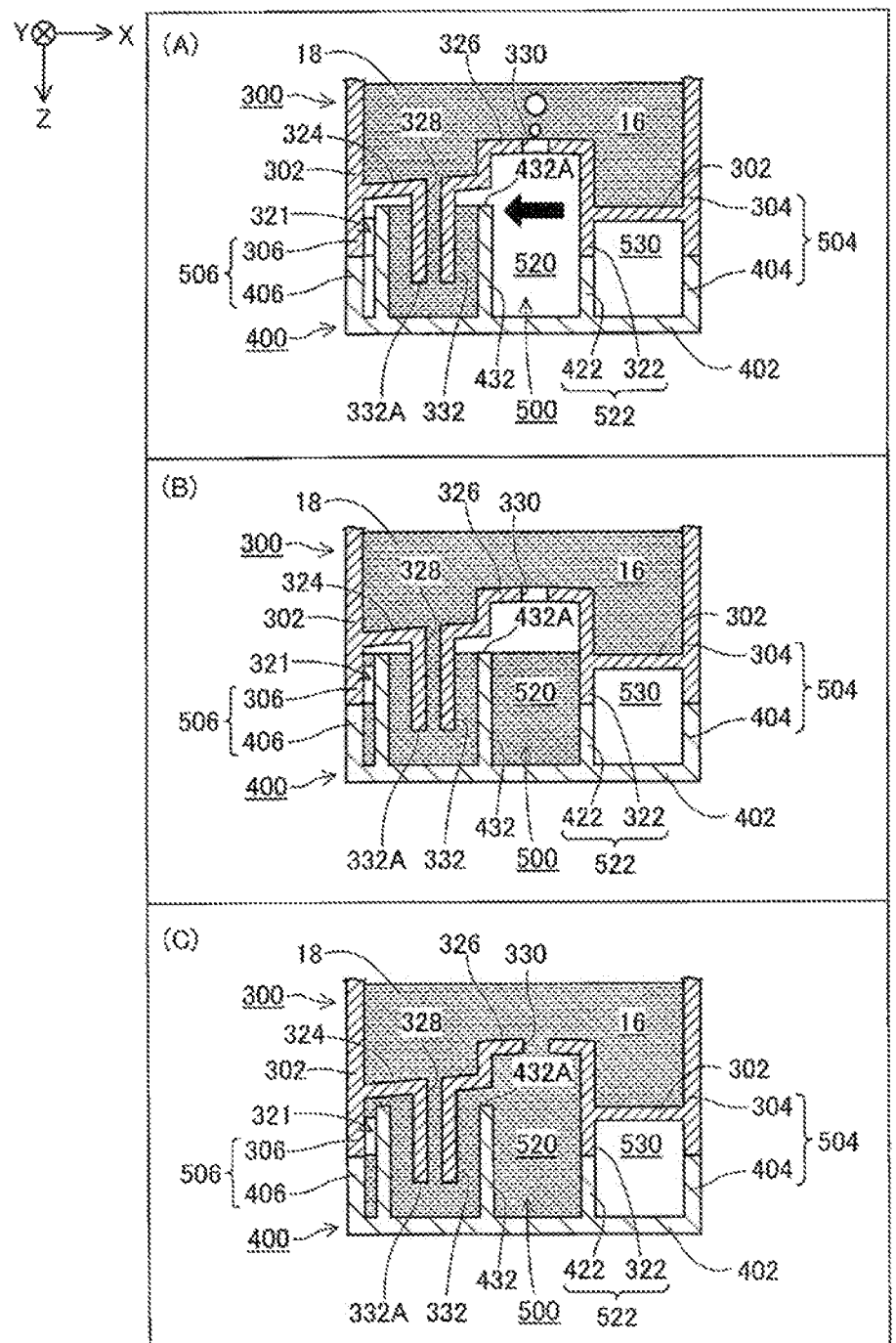
FIG. 10 is an explanatory view illustrating a change in a water level of an electrolyte solution 18 in a cell communication individual chamber 520 when the lead-acid battery 100 is in the inverted position.

FIG. 10 is an explanatory view illustrating a change in the water level of the electrolyte solution 18 in the cell communication individual chamber 520 when the lead-acid battery 100 is in the inverted position. The XZ sectional configuration of the lid 14 illustrated in FIG. 10 is obtained by vertically reversing the XZ sectional configuration of the lid 14 illustrated in FIG. 7. As illustrated in FIG. 10, when the lead-acid battery 100 is inverted in position, the electrolyte solution 18 in the cell chamber 16 first flows into the exhaust tubular wall 432 through the exhaust hole 328. Thereafter, when the space surrounded by the exhaust tubular wall 432 is filled with the electrolyte solution 18 (cf. FIG. 10(A)), the electrolyte solution 18 in the exhaust tubular wall 432 overflows to the outside of the exhaust tubular wall 432 in the cell communication individual chamber 520 (the outside of the exhaust tubular wall 432 in the upper-lid body 402). Thereafter, when the water level of the electrolyte solution 18 outside the exhaust tubular wall 432 in the cell communication individual chamber 520 reaches the lower end of the second cutout 321, the electrolyte solution 18 starts to flow out of the cell communication individual chamber 520 to the exhaust flow passage 530 through the second cutout 321. Thereafter, when the water level of the electrolyte solution 18 outside the exhaust tubular wall 432 in the cell communication individual chamber 520 becomes equal to the water level of the electrolyte solution in the exhaust tubular wall 432 (cf. FIG. 10(B)), the water level of the electrolyte solution 18 does not rise unless both inside and outside the exhaust tubular wall 432 are filled with the electrolyte solution 18, so that the rising speed of the water level of the electrolyte solution 18 in the cell communication individual chamber 520 decreases.

Here, supposing that the tip 432A of the exhaust tubular wall 432 is formed on the upper-lid body 402 side (the lower side (positive Z-axis) in FIG. 10) from at least one portion of the second cutout 321, a large amount of electrolyte solution 18 would flow out of the cell communication individual chamber 520 into the exhaust flow passage 530. That is, in such a configuration, a continuous space continuously continuing from the second cutout 321 to the reflux hole 330 in the cell communication individual chamber 520 exists for a relatively long time in the slow water level period when the rising speed of the water level of the electrolyte solution 18 is low. Through the continuous space, the vapor-liquid exchange between the inside and outside of the cell communication individual chamber 520 is promoted, and a large amount of the electrolyte solution 18 flows out of the cell communication individual chamber 520 to the exhaust flow passage 530.

In contrast, in the lead-acid battery 100 of the present embodiment, the tip 432A of the exhaust tubular wall 432 is formed at a position on the cell chamber 16 side (the upper side (negative Z-axis) in FIG. 10) from the second cutout 321. Therefore, when the water levels of the electrolyte solution 18 inside and outside the exhaust tubular wall 432 become the same, the second cutout 321 has already been brought into a closed state by the electrolyte solution 18, and the continuous space does not exist, so that the air existing in the exhaust flow passage 530 hardly enters the cell communication individual chamber 520 through the second cutout 321. Hence the vapor-liquid exchange hardly occurs inside and outside the cell communication individual chamber 520 during the slow water level period, and thereby preventing the outflow of the electrolyte solution 18 from the cell communication individual chamber 520 to the exhaust flow passage 530. That is, according to the lead-acid battery 100 of the present embodiment, the outflow of the electrolyte solution 18 from the cell communication individual chamber 520 to the exhaust flow passage 530 can be more effectively prevented in the inverted position of the lead-acid battery 100.

In the configuration where the exhaust hole 328 and the reflux hole 330 which is located closer to the cell chamber 16 (negative Z-axis) than the exhaust hole 328 are formed in the cell communication individual chamber 520 as in the lead-acid battery 100 of the present embodiment, when the lead-acid battery 100 is inverted in position, the water level of the electrolyte solution 18 in the cell communication individual chamber 520 reaches the exhaust hole 328 earlier than the reflux hole 330. As a result, the exhaust hole 328 is closed by the electrolyte solution 18, and the reflux hole 330 is opened. Here, supposing that the second cutout 321 is formed at a position closer to the reflux hole 330 than the exhaust hole 328, a large amount of the electrolyte solution 18 would flow out of the cell communication individual chamber 520 to the exhaust flow passage 530. That is, even when the water level of the electrolyte solution 18 in the cell communication individual chamber 520 reaches the exhaust hole 328, a continuous space continuously continuing from the second cutout 321 to the reflux hole 330 exits in the cell communication individual chamber 520. Through the continuous space, the vapor-liquid exchange between the inside and outside of the cell communication individual chamber 520 is promoted, and a large amount of the electrolyte solution 18 flows out of the cell communication individual chamber 520 to the exhaust flow passage 530.

In contrast, in the lead-acid battery 100 of the present embodiment, the second cutout 321 is formed at a position closer to the exhaust hole 328 than the reflux hole 330. Therefore, when the lead-acid battery 100 is inverted in position and the water level of the electrolyte solution 18 in the cell communication individual chamber 520 reaches the exhaust hole 328, the electrolyte solution 18 stored in the cell communication individual chamber 520 exists between the second cutout 321 and the reflux hole 330 in the cell communication individual chamber 520. That is, the continuous space continuously continuing from the second cutout 321 to the reflux hole 330 is not formed in the cell communication individual chamber 520. This prevents the vapor-liquid exchange between the inside and outside of the cell communication individual chamber 520. Thus, according to the lead-acid battery 100 of the present embodiment, the outflow of the electrolyte solution 18 from the cell communication individual chamber 520 to the exhaust flow passage 530 can be more effectively prevented in the inverted position of the lead-acid battery 100.

In the lead-acid battery 100 of the present embodiment, at least a portion of the surfaces of the facing surfaces of the exhaust tubular wall 432 and the exhaust sidewall 522, which form the internal flow passage Q communicating with the second cutout 321 and located closer to the cell chamber 16 (negative Z-axis) than the second cutout 321, have the uneven part T. Thereby, as illustrated in FIG. 10(C), at the time when the lead-acid battery 100 is inverted in position, and when the electrolyte solution 18 in the cell chamber 16 flows into the cell communication individual chamber 520, and the second cutout 321 is brought into a closed state by the electrolyte solution 18, the air having entered the cell communication individual chamber 520 from the exhaust flow passage 530 is prevented from moving to the reflux hole 330 by the uneven part T. Hence the vapor-liquid exchange between the inside and outside of the cell communication individual chamber 520 hardly occurs, and the electrolyte solution 18 can be prevented from flowing out of the cell communication individual chamber 520 to the exhaust flow passage 530.

In the lead-acid battery 100 of the present embodiment, the surface of the partition wall (the first partition wall 324 and the second partition wall 326) in which the second cutout 321 is formed on the upper-lid body 402 side is substantially flat, and the surface of the flow passage wall (at least a portion of the facing surfaces of the exhaust tubular wall 432 and the exhaust sidewall 522 facing each other) has the uneven part T. Thus, as compared to a case where the uneven part is formed on the partition wall, when the lead-acid battery 100 is returned from the inverted position to the normal position, the electrolyte solution 18 in the cell communication individual chamber 520 can be smoothly guided to the reflux hole 330 through the partition wall and returned to the cell chamber 16.

In the lead-acid battery 100 of the present embodiment, a plurality of coupling walls (452, 454, 472, 474) are formed in a portion of the upper-lid body 402 constituting the exhaust flow passage 530. Each of the coupling wall fences protrudes from the upper-lid body 402 toward the cell chamber 16 and continuously extends over the entire width of the exhaust flow passage 530 in a direction intersecting the exhaust flow passage 530. Thus, for example, even when the lead-acid battery 100 is inverted in position and the electrolyte solution 18 in the cell chamber 16 flows into the exhaust flow passage 530 through the cell communication individual chamber 520, the electrolyte solution 18 is first retained between the cell communication individual chamber 520 and each coupling fence. Thereafter, the electrolyte solution 18 flows into the discharge port 405 side from each coupling fence only when the electrolyte solution 18 flows out beyond each coupling fence. That is, according to the lead-acid battery 100 of the present embodiment, it is possible to prevent the electrolyte solution 18 from flowing into the discharge port 405 side of the lid 14, as compared to a configuration in which the coupling fence is not formed in the exhaust flow passage 530.

Moreover, the total volume of the second upper-lid space 462 and the third upper-lid space 464 is larger than the volume of the upper-lid exhaust sidewall 422. Thus, the electrolyte solution 18 having flowed into the exhaust flow passage 530 from the cell communication individual chamber 520 hardly reaches the third upper-lid space 464 closest to the discharge port 405 formed in the lid 14, so that the electrolyte solution 18 can be prevented from leaking out of the lead-acid battery 100 through the discharge port 405.

In the lead-acid battery 100 of the present embodiment, the volume of the first upper-lid space 460 is larger than the volume of the second upper-lid space 462. Thus, as compared to a constitution in which the volume of the first upper-lid space 460 is smaller than the volume of the second upper-lid space 462, the electrolyte solution 18 having flowed out of the cell communication individual chamber 520 hardly goes over the compartment fence closest to the cell communication individual chamber 520 and can thus be prevented from approaching the discharge port side of the lid.

B. Modifications

The techniques disclosed in the present specification are not limited to the embodiment described above but may be modified in various forms without departing from the scope of the invention, such as the following:

In the above embodiment, the exhaust tubular wall 432 formed so as to protrude from the facing wall constituting the cell communication individual chamber 520 (upper-lid body 402) has been exemplified as the inner wall, but the inner wall may be a wall separated from the facing wall or a wall of a shape other than a cylinder such as a flat plate, provided that the inner wall faces the second cutout 321.

In the above embodiment, the lid 14 may not include the communication tubular part 332. Further, in the above embodiment, the lid 14 may have a configuration in which the second cutout 321 is formed at a position closer to the reflux hole 330 than the exhaust hole 328. Moreover, in the above embodiment, the reflux hole 330 may not be formed in the cell communication individual chamber 520.

In the above embodiment, the bottom surface in the inner-lid exhaust flow passage 374 in the inner-lid body 302 may have a partition wall that is flush over the entire length of the inner-lid exhaust flow passage 374 or may not be inclined toward the second cutout 321.

In the above embodiment, the uneven part T may be formed on each surface of the exhaust tubular wall 432 and the exhaust sidewall 522 facing each other, or the uneven part T may be formed on only one surface. The uneven part T may be formed also on the upper surface of the inner-lid body 302. The uneven part T may be formed only on one or two outer surfaces of the remaining three outer surfaces of the exhaust tubular wall 432. The uneven parts T may not be formed on the facing surfaces of the exhaust tubular wall 432 and the exhaust sidewall 522. Further, the uneven part T is not limited to the one extending in the predetermined direction but may be formed by, for example, hemispherical or columnar convex parts. In addition, as another configuration in which, when the lead-acid battery 100 is inverted in position and the second cutout 321 is brought into a closed state by the electrolyte solution 18, the air having entered the cell communication individual chamber 520 from the exhaust flow passage 530 is prevented from moving to the reflux hole 330, the surface roughness of at least a portion of the facing surfaces of the exhaust tubular wall 432 and the exhaust sidewall 522 may be made larger than the surface roughness of the lower surface of the upper-lid body 402.

In the embodiment described above, the portion of the upper-lid body 402 constituting the exhaust flow passage 530 may be divided into two portions or divided into four or more portions. The volume of the first upper-lid space 460 may be smaller than that of the second upper-lid space 462.

DESCRIPTION OF REFERENCE SIGNS

- 10: housing
- 12: container
- 14: lid
- 16: cell chamber
- 18: electrolyte solution
- 20: electrode group
- 30: positive-side terminal
- 32: positive-side bushing
- 34: positive pole
- 40: negative-side terminal
- 42: negative-side bushing
- 44: negative pole
- 52: positive-side strap
- 54: negative-side strap
- 56: connection member
- 58: partition
- 100: lead-acid battery
- 210: positive electrode plate
- 212: positive current collector
- 214: positive electrode lug
- 216: positive active material
- 220: negative electrode plate
- 222: negative current collector
- 224: negative electrode lug
- 226: negative active material
- 230: separator
- 300: inner lid
- 302: inner-lid body
- 304: inner-lid peripheral wall
- 306: inner-lid partition
- 311: electrolyte solution filling hole
- 312: inner-lid electrolyte solution filling sidewall
- 321: second cutout
- 322: inner-lid exhaust sidewall
- 324: first partition wall
- 325: stepped part
- 326: second partition wall
- 327: stepped part
- 328: exhaust hole
- 330: reflux hole
- 332: communication tubular part
- 332A: upper tip
- 341: third cutout
- 342: inner-lid concentrated exhaust sidewall
- 352: coupling wall
- 354: inner-lid exhaust flow passage
- 356: rib
- 374: inner-lid exhaust flow passage
- 400: upper lid
- 402: upper-lid body
- 404: upper-lid peripheral wall
- 405: discharge port
- 406: upper-lid partition
- 407: first cutout
- 412: upper-lid electrolyte solution filling sidewall
- 422: upper-lid exhaust sidewall
- 432: exhaust tubular wall
- 432A: tip
- 442: upper-lid concentrated exhaust sidewall
- 443: duct
- 452: first coupling wall
- 454: second coupling wall
- 456: third coupling wall
- 460: first upper-lid space
- 462: second upper-lid space
- 464: third upper-lid space
- 472: fourth coupling wall
- 474: fifth coupling wall
- 480: fourth upper-lid space
- 482: fifth upper-lid space
- 484: sixth upper-lid space
- 500: compartment (inner compartment, end compartment)
- 504: peripheral wall
- 506: partition
- 510: electrolyte solution filling chamber
- 512: electrolyte solution filling sidewall
- 520: cell communication individual chamber
- 522: exhaust sidewall
- 530: exhaust flow passage
- 540: concentrated exhaust chamber
- 542: concentrated exhaust sidewall
- G: gas
- L1: first distance
- L2: second distance
- Q: internal flow passage
- T: uneven part

The invention claimed is:

1. A lead-acid battery comprising:
a container having an opening on one side in a first direction and formed with a housing chamber communicating with the opening;
a positive electrode and a negative electrode housed in the housing chamber of the container; and
a lid disposed so as to close the opening of the container and has a discharge port formed on an outer surface, wherein
a communication chamber and an external flow passage are formed inside the lid,
the communication chamber communicates with the housing chamber through a communication hole,
the external flow passage is surrounded by at least a partition wall between the housing chamber and the external flow passage and a facing wall that faces the partition wall in the first direction, the external flow passage communicating with the communication chamber through a vent hole and communicating with the discharge port of the lid,
a compartment fence is formed on the facing wall in the external flow passage, the compartment fence protruding toward the partition wall and continuously extending over an entire width of the external flow passage in a direction intersecting with the external flow passage,
a residual volume is larger than a volume of the communication chamber, the residual volume being obtained by subtracting, from a total volume of a plurality of external spaces divided by the compartment fence, a volume of a discharge-side external space closest to the discharge port among the plurality of external spaces,
the compartment fence includes a first compartment fence disposed at a position closest to the vent hole in the external flow passage, and a second compartment fence disposed at a position farther from the vent hole than the first compartment fence, and
among the plurality of external spaces, a volume of an external space between the communication chamber and the first compartment fence is larger than a volume of an external space between the first compartment fence and the second compartment fence.

\* \* \* \* \*